United States Patent [19]
Knapp et al.

[11] 3,724,946
[45] Apr. 3, 1973

[54] PHOTOGRAPHIC PRINTING ARRANGEMENT

[75] Inventors: Walter Knapp; Othmar Schneider, both of Munich, Germany

[73] Assignee: Agfa-Gevaert Aktiengesellschaft, Leverkusen, Germany

[22] Filed: Sept. 20, 1971

[21] Appl. No.: 181,885

[30] Foreign Application Priority Data

Sept. 23, 1970 Germany.................P 20 46 887.5

[52] U.S. Cl. .................355/36, 355/38, 355/68, 355/71
[51] Int. Cl. ...........................................G03b 27/78
[58] Field of Search .....355/68, 71, 36, 38; 95/10 CT

[56] References Cited

UNITED STATES PATENTS

| 3,640,619 | 2/1972 | Huber | 355/71 X |
| 3,482,916 | 12/1969 | Mey et al | 355/38 |

Primary Examiner—Samuel S. Matthews
Assistant Examiner—Michael L. Gellner
Attorney—Michael S. Striker

[57] ABSTRACT

Photographic arrangement for copying an original which includes illuminating means for illuminating the original and timing means for terminating the illumination after a preadjustable time interval corresponding to the density of the original. This photographic arrangement also includes photoelectric transducing means furnishing an illumination signal corresponding to the lighting impinging thereon. Finally, the photographic arrangement also includes energizing means interconnecting the photoelectric transducing means with the timing means so as to vary the energization signal in correspondence with the variations of the illumination signal.

7 Claims, 1 Drawing Figure

PATENTED APR 3 1973 3,724,946
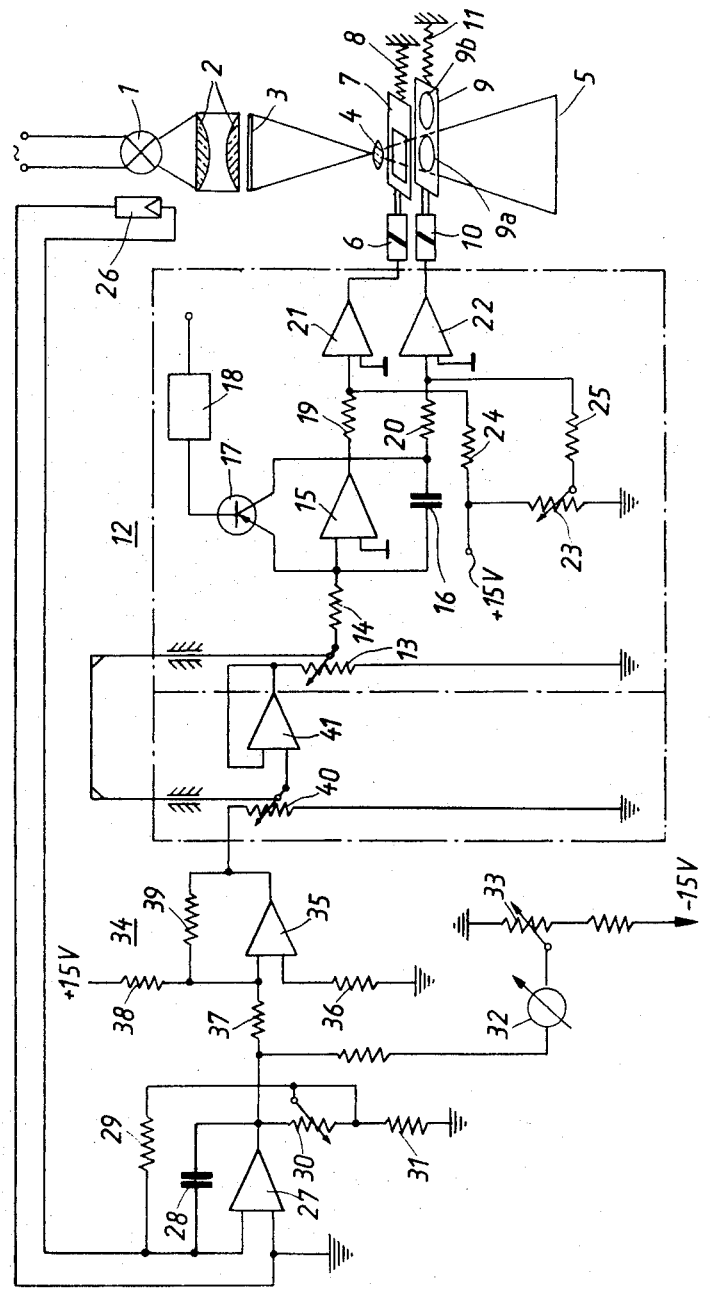
INVENTOR
WALTER KNAPP
OTHMAR SCHNEIDER
BY

PHOTOGRAPHIC PRINTING ARRANGEMENT

BACKGROUND OF THE INVENTION

This invention relates to photographic printing arrangements. Particularly, it relates to such printing arrangements wherein a source of illumination illuminates the original and wherein a timing circuit times a determined time interval after which said illumination is stopped, for example by inserting blocking means between the source of illumination and the original.

In known printing arrangements of the above-mentioned type, filters are provided which, as required, are inserted in the path of light between the light source and the original.

In some known arrangements, the intensity of light after passing through the original is utilized to influence the total exposure time, without however, taking into regard the particular color of the illumination. In such arrangements, the light is sampled between the filter and the original. This light is impinged upon a photoelectric transducer which in turn is connected to a capacitor whose potential is scanned by a disconnecting arrangement so that when this potential reaches a predetermined value, the illumination is terminated. Such a light integrating circuit arrangement is however is not practical in all cases. In particular, it is not practical when an electronic exposure control arrangement is already in use in which in the exposure of two separate colors is controlled to effect a gradation adjustment. Often it is desirable to add to this type of arrangement some means for compensating for short-time variations in the intensity of the illuminating source. Of course when relatively low power lamps are being used, the variations in intensity of illumination may be substantially reduced by keeping the energizing voltage for the lamp constant. This however is not economically feasible when high power lamps of outputs of several kilowatts are used as, for example, in the case of graphic industries. In this case, it is desirable to furnish a circuit compensating for such variations in illumination intensity and to combine such a circuit with the above-described timing means for timing the exposure in two colors.

SUMMARY OF THE INVENTION

It is an object of the present invention to furnish a circuit for compensating for variations in illumination intensity of the source of illumination in a printing process.

This invention is a photographic printing arrangement for reproducing an original having a measured density. It comprises illuminating means illuminating said original, said illuminating means having an intensity of illumination which varies randomly with time. The invention further comprises timing means terminating said illumination after a predetermined time interval depending upon said density of said original. It further comprises photoelectric transducing means positioned to receive light from said illuminating means, and furnishing an illumination signal in dependence thereon. It further comprises energizing means energizing said timing means, said energizing means comprising said photoelectric transducing means and controlling the energization of said timing means as a function of said illumination signal, whereby by said predetermined time interval depends also upon said intensity of illumination.

By this arrangement, the printing arrangement used in the graphic industry can retain the known and reliable arrangement used for the gradation adjustment by illuminating in two different colors and can still take into consideration the variations in the illuminating intensity of the lamp which occur during the exposure time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a preferred embodiment of the arrangement of the present invention.

DESCRIPTION OF THE PREFERRED EMBODIMENT

The preferred embodiment of the present invention will now be described with reference to the drawing.

The illuminating means comprise a lamp 1 whose light is impinged upon the original via, for example, a double-condensor lens 2. The image of the original 3 is formed via an objective 4 on the copying material 5. Light blocking means 7 are located between the objective 4 and the reproducing or printing material 5. The light blocking means are operable by an electromagnet 6 and interrupt the illumination when electromagnet 6 is energized. When the electromagnet is de-energized, the light blocking means are retained in the open position under a retaining spring 8. Also positioned in the path of the light is a filter holder 9 which for example has a yellow filter region 9a and a blue filter region 9b. Filter holder 9 is moved by means of an electromagnet 10. When the electromagnet is de-energized, region 9a is in the path of the light because it is retained there by means of a retaining spring 8. After the electromagnet is energized, the blue region 9b is in the path of the light.

Electronic timing means denoted by 12 comprise the means for energizing magnets 6 and 10 and are conventional timing means as for example shown in the German Offenlegungsschrift 1,572,236. These timing means comprise a first potentiometer 13 which is energized by energizing means which will be described below. In the known arrangement, this potentiometer is energized by means of a constant D.C. voltage. The potentiometer 13 has a tap which is connected to a resistance 14 which, in turn, is connected to one input of an operational amplifier 15, whose second input is grounded. Amplifier 15 has a feedback condensor 16 connected from its output to its input. The operational amplifier in conjunction with this capacitor therefore constitute integrator means. The capacitor is periodically discharged through a transistor 17 whose emitter-collector path is connected in parallel with the capacitor, and whose base is connected to a timing pulse source 18, which furnishes pulses at predetermined time instants to discharge capacitor 16.

The signal at the output of amplifier 15 is herein referred to as the integrated voltage signal. The output of amplifier 15 is connected to one input each of a comparator 21 and 22 via a resistance 19 and 20, respectively. The second inputs of these comparators are at ground potential. The reference signal for comparator 21 is furnished at the un-grounded input through a resistance 24 from the tap of a potentiometer 23. The tap of this potentiometer is connected to one end of the voltage source, while its other end is grounded. The wiper arm of the potentiometer 23 is connected through a resistance 25 to furnish the reference signal for comparator 22.

Photoelectric transducing means here a photo element 26, which may be a silicon element, is connected to both inputs of an operational amplifier 27. It is positioned in operative proximity to lamp 1 to directly receive the illumination therefrom. One input of operational amplifier 27 is at ground potential. This operational amplifier has also a feedback capacitor which serves to integrate short-time variations of the light intensity, as reflected in the illumination signal furnished by photoelement 26. Further, the input of operational amplifier 27 which is not at ground potential, is connected via a resistance 29 to the wiper arm of a variable resistance 30 which, connected in series with a resistance 31, forms a voltage divider connected from the output of amplifier 27 to ground. The arrangement of resistors 30 and 31 serves to determine the degree of amplification of amplifier 27. The operational amplifier output voltage furnished by amplifier 27 is applied to a measuring instrument, for example a moving coil instrument 32. The other terminal of instrument 32 is connected to the variable arm of a resistance 33, which forms part of a voltage divider connecting a −15 volt potential line to ground. The value of resistance 33 is so adjusted that the output voltage of amplifier 27 can be read conveniently on instrument 32. Further, the operational amplifier output voltage is also applied to the input of a circuit 34. Circuit 34 comprises an operational amplifier 35 and resistors 36, 37, 38 and 39. This circuit serves to amplify the voltage applied to its input in a determined manner. For example, the output may be less than or greater than the output which would result from a proportional amplification, in order to compensate for the Schwarzschild exponent. The latter of course defines the degree of departure of the density of a photographic layer from the reciprocity law $i \times t =$ constant. This amplifier is so adjusted that the output voltage is maintained within ± 1 percent of the desired value for changes in the intensity of illumination as reflected by photo element 26 of ± 30 percent and a Schwarzschild exponent of $p = 0.90$.

The output signal of amplifier 35 is fed via a potentiometer 40 to a further operational amplifier 41 which carries out the Schwarzschild correction corresponding to the different time durations of the exposure. The latter of course depends upon the setting of potentiometer 13. For this purpose the wiper arm of potentiometer 40 is mechanically coupled to potentiometer 13. This may for example be accomplished by mounting both potentiometers on a common adjustment shaft.

The above-described arrangement operates as follows:

It is assumed that an original is to be reproduced for which the maximum and the minimum density of the copy are to be fixed by illumination in a first and a second color. First, the minimum and maximum density of the original are measured and the setting of potentiometer 13 is adjusted for either the maximum or the minimum density as appropriate, while the setting of potentiometer 23 is adjusted to fix the relationship between the blue and the yellow illumination in correspondence with the difference between the maximum and the minimum density. Upon start of the illumination, capacitor 16 is charged immediately through amplifier 15. As soon as this capacitor reaches a voltage value which corresponds to the reference signal at comparator 22, magnet 10 is energized and the initial yellow illumination is replaced by a blue illumination. During the blue illumination, the charging of capacitor 16 continues until the voltage at the input of comparator 21 has a predetermined value, that is when the voltage furnished by amplifier 15 has a predetermined relationship to the reference signal. Electromagnet 6 is then energized, causing the light blocking means 7 to interrupt and terminate the illumination. Thus the circuit indicated in block 12 constitutes timing means, whose timing interval is determined only by the settings of potentiometers 13 and 23, but are independent of the intensity of illumination furnished by lamp 1 if a constant voltage is furnished at potentiometer 13. The voltage applied at potentiometer 13 is modified in accordance with the Schwarzschild exponent via amplifier 41. This type of timing circuit is widely used and requires relatively little equipment for carrying out timing with very high accuracy.

In accordance with the present invention, the constant voltage normally applied at potentiometer 13 or potentiometer 14 is replaced by a voltage which varies as a function of the light impinging on photo element 26. Thus the timing of timing circuit 12 is made to depend also on the intensity of illumination furnished by the lamp and therefore corresponds to the actual illumination of the printing material 5. The advantage of the particular arrangement of the invention relative to, for example, adjusting the inputs of the comparators as a function of the actual light intensity is, that even short-time variations in the brightness of the lamp are integrated with respect to time and therefore influence the timing to the same extent as does the density of the printing material.

The measuring instrument 32 serves a particular purpose. With small originals it is possible to carry out the measurement of the lightest and the darkest spot in the original by means of a densitometer by moving the original relative to the scanning area of the densitometer. This is inconvenient when large originals are being reproduced and for printing arrangements having optical focusing in the printing plane. In the latter cases, the measurement is carried out by a movable probe. However, the so-measured values depend on the illuminating intensity of the lamp. This illuminating intensity can be read on the instrument and the timing circuit can be adjusted to values which take the particular illuminating intensity at the time of measurement into consideration.

Of course the present invention using the photoelectric transducing means in the energizing source of an electronic timing arrangement can also be used advantageously when the illumination is to be carried out in a single color only, or with white light.

While the invention has been illustrated and described as embodied in a printing arrangement printing in two colors, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Photographic arrangement for copying an original, comprising, in combination, illuminating means illuminating said original, the intensity of illumination furnished by said illuminating means varying randomly with time; timing means for terminating said illumination after a pre-adjustable time interval corresponding to the density of said original, and varying as a function of an energization signal applied to said timing means; photoelectric transducing means positioned to receive light from said illuminating means, and furnishing an illumination signal corresponding to the light impinging thereon; and energizing means interconnecting said photoelectric transducing means and said timing means and comprising a first operational amplifier having an input connected to said photoelectric transducing means, and a first operational amplifier output, and first capacitor means connected from said first operational amplifier output to said input, said energizing means varying said energization signal in correspondence to the variations in said illumination signal, thereby causing said time interval to vary also as a function of the intensity of the illumination of said illuminating means.

2. An arrangement as set forth in claim 1, further comprising measuring means connected to said first operational output.

3. An arrangement as set forth in claim 2, wherein said measuring means comprise a moving coil instrument.

4. An arrangement as set forth in claim 2, wherein said measuring instrument has a first terminal connected to said first operational amplifier output, and a second terminal; further comprising a signal source furnishing a balancing signal to said second terminal.

5. An arrangement as set forth in claim 1, further comprising additional circuit means connected to said first operational amplifier output, said additional circuit means having a transfer characteristic adjustable to correspond to the Schwarzschild coefficient of said original.

6. An arrangement as set forth in claim 5, wherein the output signal of said additional circuit means is a D.C. voltage, said D.C. voltage energizing said timing means.

7. An arrangement as set forth in claim 6, wherein said timing means comprise means timing a first and second interval illuminating said original in a first and second color respectively, said means comprising integrator means integrating said D.C. voltage and furnishing an integrated voltage signal; and first and second comparator means respectively comparing said integrated voltage signal to a first and second reference signal and furnishing, respectively, a first and second comparator output signal when said integrated voltage signal has a predetermined relationship to said first and second reference signal respectively; and means terminating the illumination in said first color upon receipt of said first comparator output signal and said second color upon receipt of said second comparator output signal.

* * * * *